United States Patent

Wollenweber et al.

[11] Patent Number: 5,279,394
[45] Date of Patent: Jan. 18, 1994

[54] DISC BRAKE

[75] Inventors: Karl-Heinz Wollenweber, Ochtendung; Dieter Zimmermann, Cochem, both of Fed. Rep. of Germany

[73] Assignee: Lucas Industries public limited company, Solihull, England

[21] Appl. No.: 834,308
[22] PCT Filed: Jul. 1, 1991
[86] PCT No.: PCT/EP91/01226
§ 371 Date: Feb. 26, 1992
§ 102(e) Date: Feb. 26, 1992
[87] PCT Pub. No.: WO92/00464
PCT Pub. Date: Jan. 9, 1992

[30] Foreign Application Priority Data
Jul. 2, 1990 [DE] Fed. Rep. of Germany ... 9010026[U]

[51] Int. Cl.⁵ ............... B60T 8/52; F16D 55/224
[52] U.S. Cl. .................. 188/1.11; 188/73.42; 188/73.43; 188/181 T; 303/112
[58] Field of Search ............ 188/1.11, 181 T, 71.1, 73.43, 73.44, 73.45, 73.42, 73.41; 303/112

[56] References Cited
U.S. PATENT DOCUMENTS 2,183,700 12/1939 Sinclair .
3,166,159 1/1965 Burnett ..................... 188/73.42
3,689,121 9/1972 Kawabe et al. ............. 188/181 T X
4,666,021 5/1987 Messersmith ............... 188/216 X
4,679,668 7/1987 Washizu et al. ............ 188/181 T X
4,716,994 1/1988 Iwamoto ..................... 188/72.2
4,775,033 10/1988 Heibel ....................... 188/71.1

FOREIGN PATENT DOCUMENTS 0221299 5/1987 European Pat. Off. .
0229618 7/1987 European Pat. Off. .
2043729 3/1971 Fed. Rep. of Germany .
2043278 3/1972 Fed. Rep. of Germany .
2176555 12/1986 United Kingdom .

OTHER PUBLICATIONS

Research Disclosure, No. 270, Oct. 1986.
Patent Abstracts of Japan, vol. 12, No. 292 Aug. 10, 1988 and JP-A-63 068449 Mar. 28, 1988.

Primary Examiner—Douglas C. Butler
Attorney, Agent, or Firm—Oblon, Spivak, McClelland, Maier & Neustadt

[57] ABSTRACT

A disc brake having two brake pads adapted to be pressed against the brake disc on either side is supported via guide pins (34, 36, 38, 40) on a brake support (10) with respect to the frictional forces occurring on braking. A force sensor is arranged on or in the guide pins to measure the brake torque directly.

6 Claims, 4 Drawing Sheets

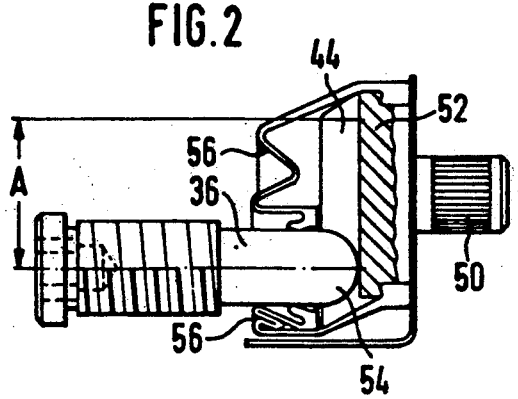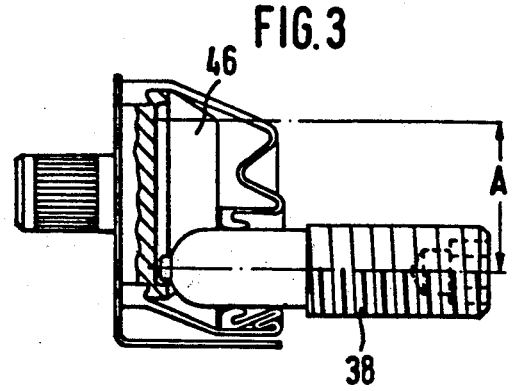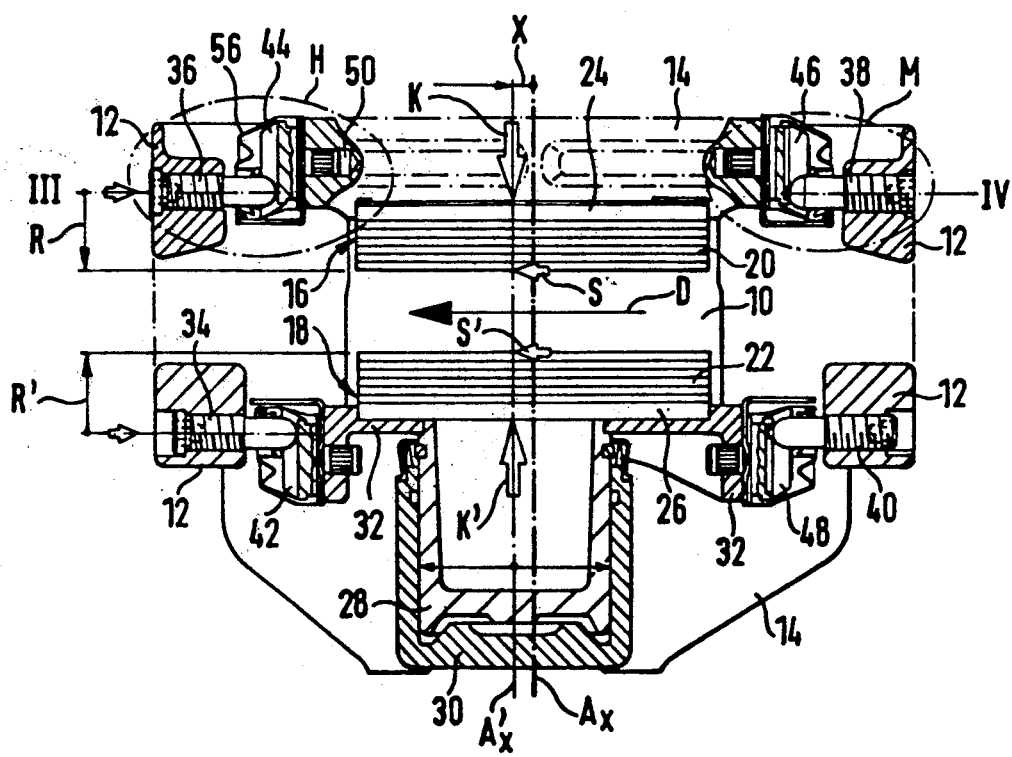

DISC BRAKE

The invention relates to a disc brake comprising two pads which are adapted to be pressed against the brake disc on both sides and which are supported on a vehicle-fixed support with respect to a force generated when the brake pads bear on the brake disc, and at least one force sensor arranged in the path of the force between one of the brake pads and the support for measuring the brake torque.

Such a disc brake is known from EP 0 221 299 A2, cf. therein in particular FIG. 4. In the latter, on the support plate of a brake lining in a sliding caliper brake a torque sensor is provided which is arranged in the path of force of the frictional force (so-called peripheral force) generated by brake friction between the brake disc and the friction linings and the vehicle-fixed support.

In addition, the invention proceeds from prior art as known from EP 0 229 618 A2. The disclosure content of that publication is expressly made part of the content of the present application. The sliding caliper spot-type disc brake for motor vehicles described therein has a sliding caliper which is displaceably mounted with respect to a vehicle-fixed support, two brake pads which act on the brake disc on both sides and have support plates for brake linings on their sides remote from the brake disc, a hydraulic piston-cylinder assembly in the sliding caliper which acts directly on one of the two brake pads and on the other brake pad via the sliding caliper, and a slide guide between the support and the sliding caliper. It is distinguished in that one of the lining support plates is supported solely at the sliding caliper and the other solely at the piston of the piston-cylinder assembly and that between the piston or a component fixedly connected therewith and the support a further slide guide is provided. However, this known disc brake does not include any measuring device for determining the brake torque.

In progressive braking, knowledge of the brake torque actually generated braking by friction is extremely desirable.

U.S. Pat No. 2,183,700 discloses a direct measurement of the brake torque in a drum brake. For the measurement therein, an eccentric pin is arranged between the brake pads and a frictional force generated on braking effects a turning of the pin. The rotary force acting on the pin is proportional to the actually generated brake torque but is independent of the actuating force applied by means of the brake pedal. Said pin turning on generation of a brake torque is provided with a means which on rotation thereof acts on an electrical circuit in such a manner that a signal is emitted which is proportional to the rotation and thus to the brake torque.

This prior art is already based on the recognition that the brake torque actually generated on braking is in no way always a clear function of the hydraulic pressure generated in the brake cylinder with the brake pedal. The causes of the absence of such a clear relationship may be very varied and extend from defective brakes through worn brake linings up to changes in the coefficient of friction between the brake disc (or the brake drum) and the brake pads due to different temperatures.

Exact knowledge of the actual magnitude of the brake torque generated by friction can serve a variety of purposes; in particular, the brake torque can be used to control the brake system, to monitor the latter, to determine the road adhesion coefficient, to control the drive engine, to control the starting coupling (cf aforementioned EP 0 221 299 A2), to control the switching stages of the vehicle transmission and for connecting or disconnecting drive axles.

The direct measurement of the brake torque is particularly significant as a reliable means for monitoring the function of brakes. Except for the brake torque, all the parameters measurable in a brake can erroneously simulate a functioning brake during a measurement. In contrast, the measurement of the brake torque is the most direct and most reliable way of monitoring the function of a brake. In particular, the direct measurement of brake torques generated permits a comparison of the left and right vehicle wheels, the brakes of the rear wheels being of particular significance. Unequal brake torques on the left and right sides of the vehicle lead to dangerous yaw moments about the vertical axis of the vehicle.

If in a vehicle equipped with an antilock system the brake torque at the braked wheels is measured directly, it is possible to derive therefrom information on the adhesion coefficient between the vehicle tires and the road surface. For the brake torque which leads to a slip of the tires of the vehicle, indicating a tendency to lock, i.e. which lies above a predetermined threshold value, is a function of the coefficient of adhesion and consequently conversely the adhesion coefficient can be derived from the brake torque measured. The same applies to the relationship between a given slip and the brake torque.

The invention is based on the problem of further developing a disc brake of the type mentioned at the beginning in such a manner that with simple and reliable means measurement of the brake torque is possible.

Solutions according to the invention are characterized with the embodiments set forth in the claims.

The arrangement of the force sensor according to the invention in a guide pin permits a double function of the guide pin, that is firstly guiding the moving parts of the brake with respect to the vehicle-fixed brake support and secondly the direct measurement of the brake torque.

The guide pin according to the invention may either be mounted directly on the vehicle-fixed support and engage in a movable slide groove for guiding a component on which the slide groove is formed, or the guide pin can on the other hand be mounted on the sliding component (e.g. on a sliding caliper) and engage slidingly into a groove which is fixedly connected to the vehicle-fixed brake support. The braking force is conducted solely via the guide pin into the brake support, i.e. no further supports are provided on the brake in a direction opposite to the braking force direction.

The invention can preferably be implemented with a sliding caliper spot-type disc brake.

Preferably, the guide pin comprises a convexly rounded head which comes into engagement with preferably complementarily concavely rounded walls of the groove. This makes exact measurements of the brake torque possible even when the brake exhibits bending phenomena under extremely high load.

Preferably provided as force sensor are foil strain gauges which are arranged on a separate sleeve which can be incorporated into the guide pin. Preferably, such foil strain gauges are arranged both in the direction of the axis of the guide pin and perpendicularly thereto, in a socalled bridge circuit for compensating effects falsifying the measurement. Such a bridge circuit is known as such in foil strain gauges.

Hereinafter the invention will be explained in detail with the aid of an example of embodiment. In the drawings:

FIG. 1 is a plan view of a sliding caliper spot-type disc brake;

FIG. 2 shows the detail "H" of FIG. 1 to a larger scale;

FIG. 3 shows the detail "M" of FIG. 1 to a larger scale;

Figure 6:
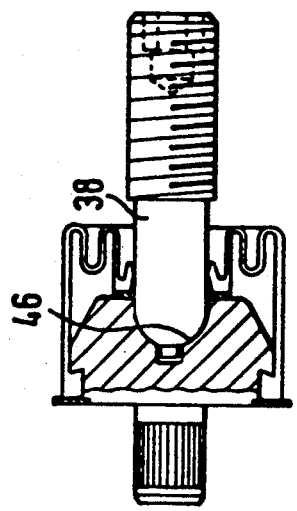
FIG. 6 shows the detail "V" of FIG. 5 to a larger scale.

The sliding caliper spot-type disc brake shown in FIGS. 1 to 6 comprises a brake disc, the position of which is indicated by the reference numeral 10 and which on forward travel of the vehicle moves in the plan view according to FIG. 1 in the direction of the arrow D.

The brake is supported in conventional manner on a brake support 12 which is mounted fixed with respect the vehicle, i.e. does not move relatively to the vehicle. A sliding caliper 14 engages over the brake disc 10 (see also FIG. 4).

Two brake pads 16, 18 are arranged on either side of the brake disc 10 and each have a brake pad lining 20 and 22 respectively which is adapted to be pressed against the brake disc 10 for braking. The application of the brake pad linings 20, 22 to the brake disc 10 takes place in the direction of the arrows K, K' which represent the clamping force. The clamping action between the brake pad linings 20, 22 and the brake disc 10 generates a frictional force which is represented by the arrows S, S'.

In usual manner the brake pad linings 20, 22 are mounted on respective support plates 24, 26. In the sliding caliper spot-type disc brake shown (which to this extent corresponds to EP 0 229 618 A2 cited at the beginning) there is no direct supporting of the support plates 24, 26 at corresponding guides on the brake support. On the contrary, the supporting is effected via guide pins which will be described in detail hereinafter.

In conventional manner the sliding caliper brake comprises a piston 28 which is movable in a cylinder 30 for actuating the brake on generation of a brake pressure in the cylinder 30.

A carriage 32 is fixedly connected to the piston 28.

The forces in the direction of the arrows S, S' generated on braking are taken up solely via guide pins 34, 36, 39, 40, the guide pins 34, 36 taking up the forces on braking in the forward direction whilst the guide pins 38, 40 introduce forces into the brake support 12 when braking takes place when the vehicle is travelling in the reverse direction. Since for a usual motor vehicle only the knowledge of the brake torque when the vehicle is travelling forwards is of interest, in the example of embodiment illustrated only the guide pins 34, 36 loaded on braking when travelling in the forward direction are provided with a force sensor, which will be described in detail below.

The guide pins 34, 36, 38, 40 engage in grooves 42, 44, 46 and 48. The grooves extend parallel to the rotational axis Ax of the brake disc 10 and are each formed in groove bodies (in FIG. 2 only one such groove body is shown with respect to the guide pin 36). The groove bodies 52 are each secured to holding pins on the moving parts of the brake, the groove bodies arranged at the top in FIG. 1 to the sliding caliper 14 and the groove bodies arranged at the bottom in FIG. 1 on the carriage 32. On actuation of the brake the groove bodies 52 slide over the guide pins.

In FIG. 2 a spacing is indicated by "A" and corresponds to the wear of the brake pad lining 20.

Furthermore, in FIG. 1 the piston axis Ax' is shown which is displaced with respect to the rest position main axis Ax by the socalled axial displacement "X" (also referred to as axial offsetting) and on which during braking the brake pads 16, 18 of the brake are actuated. Clamping forces K, K' of equal magnitude but oppositely directed act on the brake pads on either side of the brake disc.

The quantity "X" is drawn in FIG. 1 substantially to scale. The frictional forces are indicated by the arrows S, S'. The lever arm of the forces S, S' with respect to the centre axis of the guide pins 34, 36 is denoted by R and R' respectively.

On braking, the brake is in equilibrium with respect to all the torques generated in the plane of the paper according to FIG. 1 if the product of the axial displacement "X" by the clamping force K is equal to the product of the frictional force S by the lever arm R. The axial displacement "X" and the lever arm R are constant in this brake.

Figure 4:
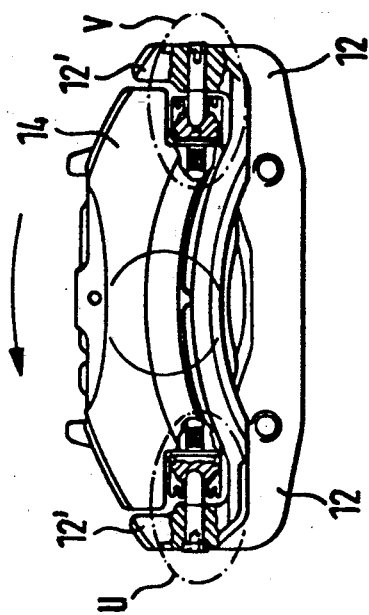
FIG. 4 is a side elevation of the disc brake according to FIG. 2 (seen in the direction of the axis of rotation of the disc brake)
Figure 5:
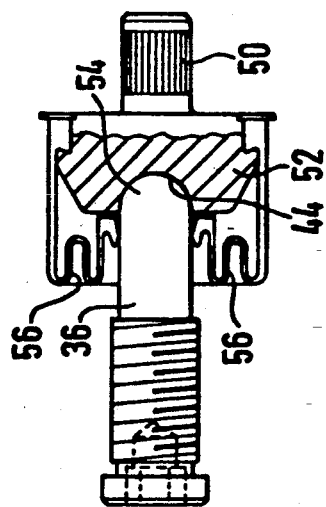
FIG. 5 shows the detail "U" of FIG. 4 to a larger scale.

FIG. 4 shows a section along the line III-IV of FIG. 1 and FIGS. 5 and 6 each show the details U and V of FIG. 4 to a larger scale.

As apparent in particular from FIG. 5, the groove 44 is also made rounded and is a complementary fit on a rounded head 54 of the associated guide pin 36. A packing 56 covers the guide pin 36 and in particular the head 54 thereof.

On actuation of the brake the groove body 52 moves in FIG. 2 relatively to the guide pin 36 in the plane of the paper, i.e. corresponding to the arrow A, whilst in FIG. 5 a brake actuation means a movement of the groove body 52 relatively to the guide pin 36 perpendicularly to the plane of the paper.

Figure 8:
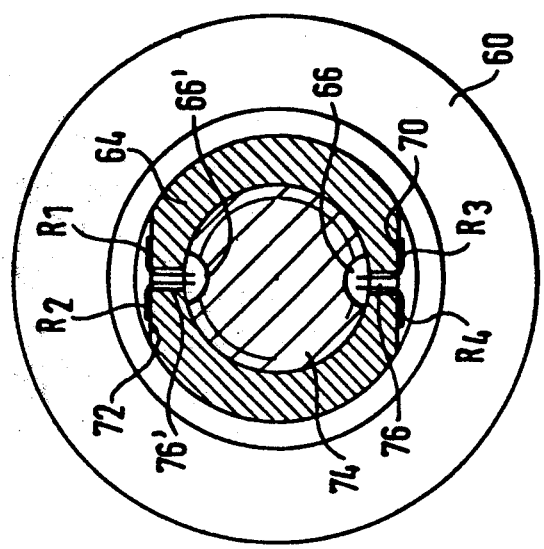
FIG. 8 is a section along the line I-II of FIG. 7.
Figure 7:
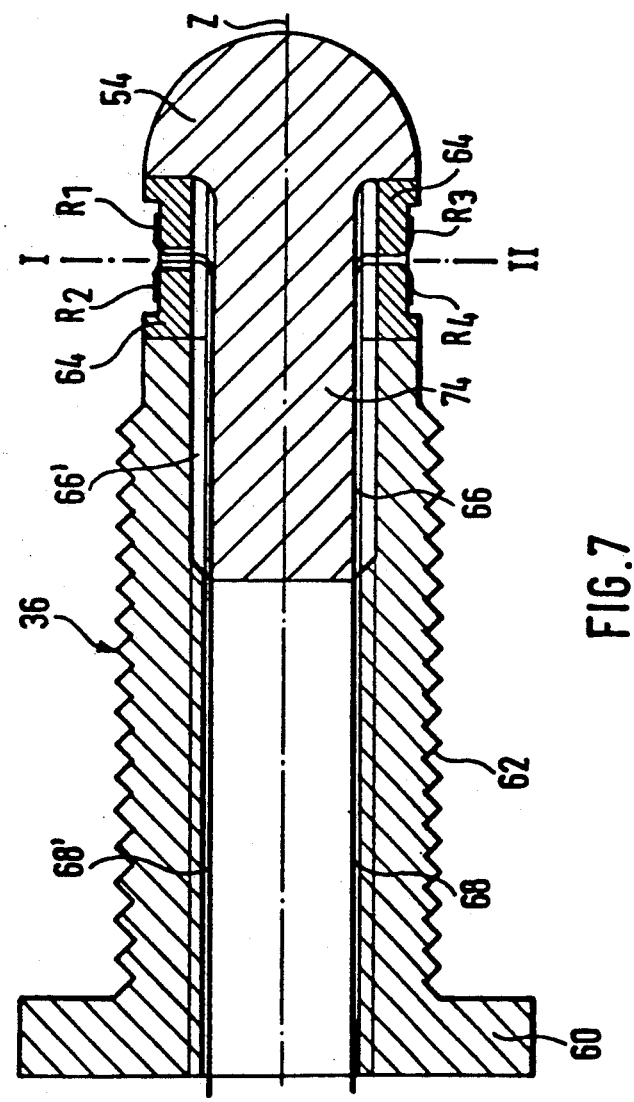
FIG. 7 is an axial section through a guide pin with force sensor.

FIGS. 7 and 8 show a guide pin 36 by way of example in detail.

The guide pin 36 comprises a threaded sleeve 62 having a head 60 which may be provided with key faces. Furthermore, the guide pin consists of a sensor sleeve 64 and the head portion 54 already referred to above. The threaded sleeve 62 has an internal thread into which the head portion 54 is screwed with a bolt portion 74 having an external thread. The sensor sleeve 64 is clamped between the head portion 54 and the threaded sleeve 62. It is also possible to weld the sensor sleeve 64 in the assembled state for example to the head portion 54.

Grooves 66 and 66' (see also FIG. 8) are formed diametrically opposite each other in the external thread of the bolt portion 74 and in the internal thread of the threaded sleeve 62 and in the sensor sleeve 64 respectively, cables 68, 68' extending through said grooves. The cables are connected to foil strain gauges $R_1$, $R_2$, $R_3$, and $R_4$.

For the assembly of the foil strain gauges planar faces 70, 72 are formed on the outer surface of the sensor sleeve 64 and from each of said faces a channel 76 or 76' leads to the groove 66 and 66' respectively so that the cables can be connected to the foil strain gauges $R_1$, $R_4$. The faces 70, 72 are polished.

Figure 9:
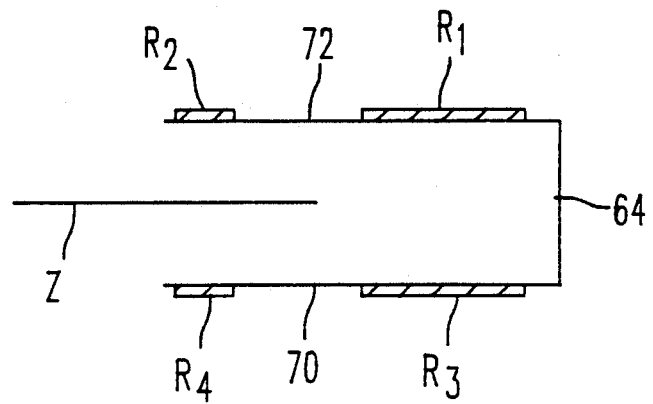
FIG. 9 shows schematically the application of foil strain gauges to a sensor sleeve and FIG. 10 shows the electrical wiring of the foil strain gauges in a bridge circuit.
Figure 10:
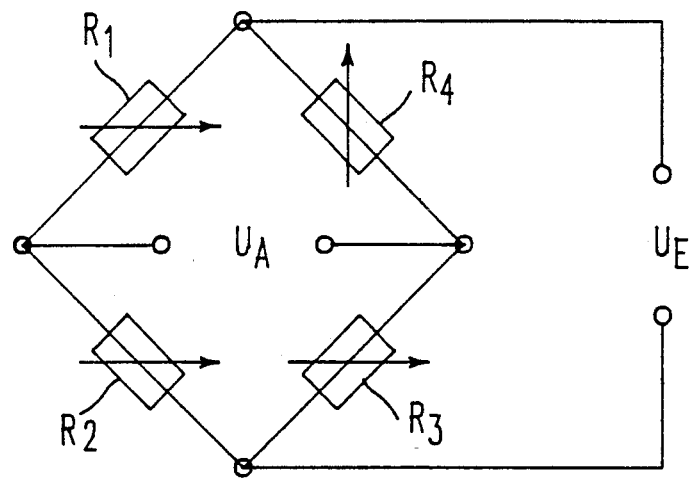

The arrangement of the foil strain gauges is shown schematically in FIG. 9. The foil strain gauges $R_1$, $R_3$ are mounted parallel to the centre axis Z of the guide pin on the planar faces 72 and 70 respectively whilst the foil strain gauges $R_2$, $R_4$ are aligned perpendicularly with respect to the centre axis Z. In accordance with the bridge circuit in FIG. 10 known per se the foil strain gauge $R_1$ is connected in parallel with $R_3$ whilst $R_2$ is connected in parallel with $R_4$. The bridge circuit compensates interference quantities which may in particular be temperature fluctuations, bending and/or turning moments, so that only the force S acting on the guide pin 36 is measured as measurement signal. The peripheral forces S, S' are directly proportional to the brake torque.

On assembly of the guide pin 36 (FIG. 7) firstly the sensor sleeve 64 is pushed onto the bolt portion 74 of the head portion 54. The cables 68, 68', which are led through the channels 76 and 76', are embedded in the bottom of the grooves 66, 66'. The sensor sleeve 64 may for example be fixedly connected to the head portion 54 by means of laser beam welding. This unit is then screwed over the bolt portion 74 with the threaded sleeve 62. Instead of the welding referred to, the parts may also be positioned by form-locking with respect to each other.

The packing 56 (FIG. 2) protects the foil strain gauges from dirt, moisture, etc.

The sensor sleeve 64 described above with the foil strain gauges arranged thereon may also be used on other push or thrust rods of a vehicle, for example for measuring the actuating force of a brake.

We claim:

1. In a disc brake comprising two pads (16, 18) which are adapted to be pressed against respective opposite sides of a brake disc (10) and transmit to a vehicle-fixed support (12) braking force (S) generated along a path which is dependent on the direction of disc rotation when said brake pads (16, 18) bear on said brake disc (10), and at least one force sensor (64, $R_1$, $R_2$, $R_3$, $R_4$) arranged in the path of said braking force (S) between at least one of said brake pads (16, 18) and said fixed support (12) for measuring brake torque as a function of force sensed by said force sensor, characterized in that said at least one force sensor (64, $R_1$, $R_2$, $R_3$, $R_4$) is carried by at least one guide pin of a pair of guide pins (34, 36) mounted on one of said fixed support (12) and said at least one of said brake pads (16, 18), said at least one guide pin (34, 36) engaging into at least one slide groove of a pair of slide grooves (42, 44) mounted on the other of said fixed support (12) and said at least one of said brake pads (16, 18), said guide pins (34, 36) and said slide grooves (42, 44) being displaceable with respect to each other to guide said pads (16, 18), said guide pins (16, 18) and said slide grooves (42, 44) being sole conductors of braking force from said brake pads (16, 18) to said fixed support (12), said at least one force sensor (64, $R_1$, $R_2$, $R_3$, $R_4$) being disposed on said at least one guide pin (34, 36) in a position to sense braking force exerted on said at least one guide pin (34, 36) when said at least one guide pin and said at least one slide groove are thrust together by said disc (10) upon application of the brake.

2. In the disc brake of claim 1 wherein said at least one guide pin (34, 36) is mounted on said fixed support (12) and said at least one slide groove (42, 44) is mounted on said at least one brake pad (16, 18).

3. Disc brake according to claim 1 or 2, characterized in that the disc brake is a sliding caliper spot-type disc brake and that each of said guide pins (34, 36) is the sole support of respective brake pad with respect to the force (S, S').

4. Disc brake according to claim 1 or 2, characterized in that each of said guide pins (34, 36) has a rounded head (54) which comes into engagement with complementarily shaped walls of said slide grooves (42, 44).

5. Disc brake according to claim 1 or 2, characterized in that said force sensor comprises foil strain gauges ($R_1$, $R_2$, $R_3$, $R_4$) arranged on said at least one guide pin (34, 36).

6. Disc brake according to claim 5, characterized in that said foil strain gauges are arranged both in the direction of longitudinal axis (Z) of said at least one guide pin (34, 36) and perpendicularly thereto.

* * * * *